United States Patent
Kulkarni

(10) Patent No.: US 12,541,422 B2
(45) Date of Patent: Feb. 3, 2026

(54) DATA RECONCILIATION FOR A MULTI-CHANNEL PIPELINE

(71) Applicant: Capital One Services, LLC, McLean, VA (US)

(72) Inventor: Kirankumar Kulkarni, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 18/466,501

(22) Filed: Sep. 13, 2023

(65) Prior Publication Data

US 2025/0086050 A1     Mar. 13, 2025

(51) Int. Cl.
| | | |
|---|---|---|
| *G06F 16/00* | (2019.01) | |
| *G06F 11/07* | (2006.01) | |
| *G06F 11/22* | (2006.01) | |
| *G06F 16/23* | (2019.01) | |

(52) U.S. Cl.
CPC ...... *G06F 11/0793* (2013.01); *G06F 11/2215* (2013.01); *G06F 16/2365* (2019.01)

(58) Field of Classification Search
CPC ... G06F 16/2365; G06F 16/00; G06F 11/0793
See application file for complete search history.

(56) References Cited

U.S. PATENT DOCUMENTS

| | | | | |
|---|---|---|---|---|
| 11,809,452 | B2 * | 11/2023 | Devan ................. | G06F 11/0751 |
| 2019/0147080 | A1 * | 5/2019 | Nikitina ................. | G06F 9/547 |
| | | | | 707/703 |
| 2022/0137821 | A1 * | 5/2022 | Monden ................ | G06F 3/0605 |
| | | | | 711/154 |
| 2022/0382739 | A1 * | 12/2022 | Miliauskas ......... | G06F 16/2365 |

* cited by examiner

*Primary Examiner* — Cheryl Lewis
(74) *Attorney, Agent, or Firm* — Harrity & Harrity, LLP

(57) ABSTRACT

In some implementations, a device may obtain, via a source platform, source data that is to be provided to a target platform to be stored in one or more databases included in the target platform, wherein the one or more databases are accessible via a data integration pipeline. The device may provide the source data via the data integration pipeline to cause input data to be provided to the target platform. The device may obtain sets of intermediate data associated with respective channels of multiple channels included in the data integration pipeline. The device may determine, based on a comparison of the source data, the sets of intermediate data, and the input data, data reconciliation information indicating one or more data discrepancy events and channels associated with respective data discrepancy events of the one or more data discrepancy events. The device may perform, based on the data reconciliation information, an action.

20 Claims, 6 Drawing Sheets

DATA RECONCILIATION FOR A MULTI-CHANNEL PIPELINE

BACKGROUND

Data reconciliation is a process in the field of data management and analysis associated with ensuring the consistency, accuracy, and/or reliability of data across different sources or components of a system. A data reconciliation process may address discrepancies and inconsistencies that may arise due to factors such as data entry errors, system failures, and/or data integration or data migration from diverse sources, among other examples. By employing various data reconciliation operations, a device or system may identify inconsistencies, detect outliers, and/or resolve conflicts within datasets, among other examples. The data reconciliation process may be important for ensuring accurate data for informed decision-making, regulatory compliance, and/or maintaining operational efficiency, among other examples.

SUMMARY

Some implementations described herein relate to a system for data reconciliation for a multi-channel pipeline. The system may include one or more memories and one or more processors communicatively coupled to the one or more memories. The one or more processors may be configured to obtain, via a source platform, source data that is to be provided to a target platform to be stored in one or more databases included in the target platform, wherein the one or more databases are accessible via a function associated with the target platform. The one or more processors may be configured to provide the source data via the multi-channel pipeline to cause input data to be provided to the function, wherein the source data is an input of the multi-channel pipeline and the input data is an output of the multi-channel pipeline. The one or more processors may be configured to obtain sets of intermediate data associated with respective channels of multiple channels included in the multi-channel pipeline. The one or more processors may be configured to compare the source data, the sets of intermediate data, and the input data based on one or more data normalization operations associated with at least one of the sets of intermediate data. The one or more processors may be configured to identify, based on comparing the source data, the sets of intermediate data, and the input data, data reconciliation information indicating one or more data discrepancy events and channels, of the multiple channels, associated with respective data discrepancy events of the one or more data discrepancy events. The one or more processors may be configured to perform, based on the data reconciliation information, an action.

Some implementations described herein relate to a method for data reconciliation for a target platform. The method may include obtaining, by a device and via a source platform, source data that is to be provided to the target platform to be stored in one or more databases included in the target platform, wherein the one or more databases are only accessible via a multi-channel pipeline. The method may include providing, by the device, the source data via the multi-channel pipeline to cause input data to be provided to the target platform. The method may include obtaining, by the device, sets of intermediate data associated with respective channels of multiple channels included in the multi-channel pipeline. The method may include determining, by the device and based on a comparison of the source data, the sets of intermediate data, and the input data, data reconciliation information indicating one or more data discrepancy events and channels, of the multiple channels, associated with respective data discrepancy events of the one or more data discrepancy events. The method may include performing, by the device and based on the data reconciliation information, an action.

Some implementations described herein relate to a non-transitory computer-readable medium that stores a set of instructions. The set of instructions, when executed by one or more processors of a device, may cause the device to obtain, via a source platform, source data that is to be provided to a target platform to be stored in one or more databases included in the target platform. The set of instructions, when executed by one or more processors of the device, may cause the device to provide the source data via a multi-channel pipeline data to cause input data to be provided to the target platform, wherein the source data is an input of the multi-channel pipeline and the input data is an output of the multi-channel pipeline. The set of instructions, when executed by one or more processors of the device, may cause the device to obtain sets of intermediate data associated with respective channels of multiple channels included in the multi-channel pipeline. The set of instructions, when executed by one or more processors of the device, may cause the device to compare the source data, the sets of intermediate data, and the input data based on one or more data normalization operations associated with at least one of the sets of intermediate data. The set of instructions, when executed by one or more processors of the device, may cause the device to identify, based on comparing the source data, the sets of intermediate data, and the input data, data reconciliation information indicating one or more data discrepancy events and channels, of the multiple channels, associated with respective data discrepancy events of the one or more data discrepancy events. The set of instructions, when executed by one or more processors of the device, may cause the device to perform, based on the data reconciliation information, an action.

DETAILED DESCRIPTION

Figure 1A:
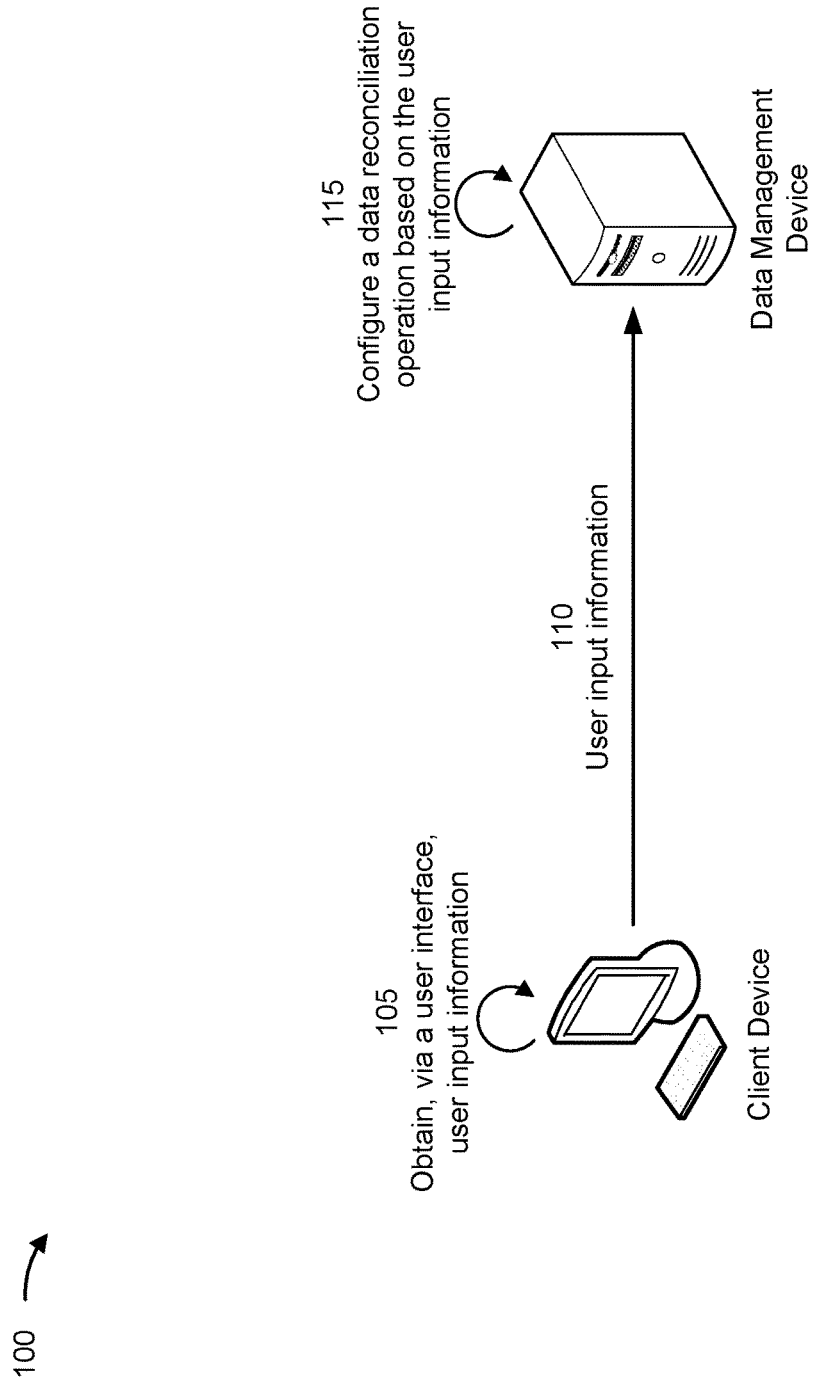
FIGS. 1A-1C are diagrams of an example associated with data reconciliation for a multi-channel pipeline, in accordance with some embodiments of the present disclosure.

The following detailed description of example implementations refers to the accompanying drawings. The same reference numbers in different drawings may identify the same or similar elements.

Data migration or data integration is a process associated with transferring data from one system, format, or location to another. The process may be undertaken when organizations upgrade systems, adopt new technologies, consolidate data, and/or transition to different platforms, among other examples. Successful data migration may ensure that valuable data is moved accurately, securely, and/or efficiently while maintaining an integrity of the data.

In some examples, a data migration or data integration process may include transferring data via a multi-channel pipeline. For example, a target platform may be accessible only via a function (e.g., an application programming interface (API) or another program). For example, rather than transferring data to the target platform by directly accessing and/or editing one or more databases included in the target platform, the data may be provided to an API and the API may cause the one or more databases to be edited (e.g., to ensure that the database(s) are properly managed). In such examples, a data migration or data integration process may include transferring data via a multi-channel pipeline such that the multi-channel pipeline transforms and/or generates the data so that the data can be successfully provided to the API associated with the target platform.

Data reconciliation in the context of data migration or data integration through a multi-channel pipeline may be associated with one or more challenges. For example, transferring data via a multi-channel data migration may involve moving data from multiple sources to the target platform using different channels simultaneously, such as batch processes, real-time streams, and/or APIs, among other examples. Coordinating and ensuring data consistency across these diverse channels may be complex. One challenge may be managing data latency across channels, as real-time streams may update data more frequently than batch processes, potentially causing inconsistencies if not synchronized properly.

Additionally, data mapping and transformation may become intricate due to varying data structures and formats across systems and channels, which can lead to data discrepancies during a data migration operation or a data integration operation. Data quality issues, such as missing or erroneous data, can further complicate reconciliation efforts. Maintaining referential integrity between related data elements may be challenging, such as when data is being migrated from multiple sources to a consolidated target. Ensuring end-to-end visibility and traceability of data movement across channels for monitoring and validation purposes adds additional complexity. For example, a device may identify one or more discrepancies in data as provided from a source platform and data as stored in the target platform. However, the device may be unable to identify where in the multi-channel pipeline an error occurred to cause the one or more discrepancies. As a result, processing resources, computing resources, and/or network resources may be consumed associated with investing each channel of the multi-channel pipeline to identify the channel associated with the error, to investigate operations of the channel to determine a cause of the error, and/or to remedy the cause of the error, among other examples.

Some implementations described herein enable data reconciliation for a multi-channel pipeline. In some implementations, the data reconciliation may be associated with an target platform (e.g., a platform for which data can be added, edited, or otherwise accessed via a function or program, such as an API). For example, a data management device collect intermediate data from each channel of a multi-channel pipeline (e.g., where the multi-channel pipeline is used to transform, prepare, generate, and/or otherwise provide data to the API associated with a target platform). The data management device may analyze the intermediate data to determine data reconciliation information indicating any data discrepancy events and channels, of the multiple channels, associated with respective data discrepancy events. This enables the data management device to track data mapping and transformation across varying data structures and formats across systems and channels, thereby providing end-to-end visibility and traceability of data movement across channels for monitoring and validation for the multi-channel pipeline.

For example, the data management device may obtain, via a source platform, source data that is to be provided to the API controlled platform to be stored in one or more databases included in the API controlled platform (e.g., the one or more databases may be accessible via an API associated with the API controlled platform). The data management device may provide the source data via a multi-channel pipeline to cause input data to be provided to the API. For example, the source data may be an input of the multi-channel pipeline and the input data may be an output of the multi-channel pipeline. The data management device may obtain sets of intermediate data associated with respective channels of multiple channels included in the multi-channel pipeline.

The data management device may compare the source data, the sets of intermediate data, and the input data based on one or more data normalization operations associated with at least one of the sets of intermediate data. For example, the channels of the multi-channel pipeline may be associated with different data formats, different naming conventions, and/or different schema, among other examples. The one or more data normalization operations may include operations that are specific to two sets of data being compared (e.g., specific to two channels associated with the two sets of data) to enable the data management device to accurately compare the data at each stage or each step of the multi-channel pipeline. The data management device may identify, based on comparing the source data, the sets of intermediate data, and the input data, data reconciliation information indicating one or more data discrepancy events and channels, of the multiple channels, associated with respective data discrepancy events of the one or more data discrepancy events. The data management device may perform, based on the data reconciliation information, one or more actions.

As a result, the data management device may coordinate and ensure data consistency across diverse channels of the multi-channel pipeline. Additionally, the data management device may be enabled to handle data mapping and transformation across channels due to varying data structures and formats across systems and channels to ensure accurate data comparisons and data reconciliation operations. Further, by obtaining the sets of intermediate data, the data management device may be enabled to compare data transitions between any two channels of the multi-channel pipeline, providing additional insight into operations or channels causing an error in a data integration or data migration operation. For example, the data management device may identify where in the multi-channel pipeline an error occurred to cause one or more discrepancies in the data being provided to the API controlled platform. As a result, the data management device may conserve processing resources, computing resources, and/or network resources that would have otherwise been associated with investing each channel of the multi-channel pipeline to identify the channel associated with the error, to investigate operations of the channel to determine a cause of the error, and/or to remedy the cause of the error, among other examples.

Figure 1B:
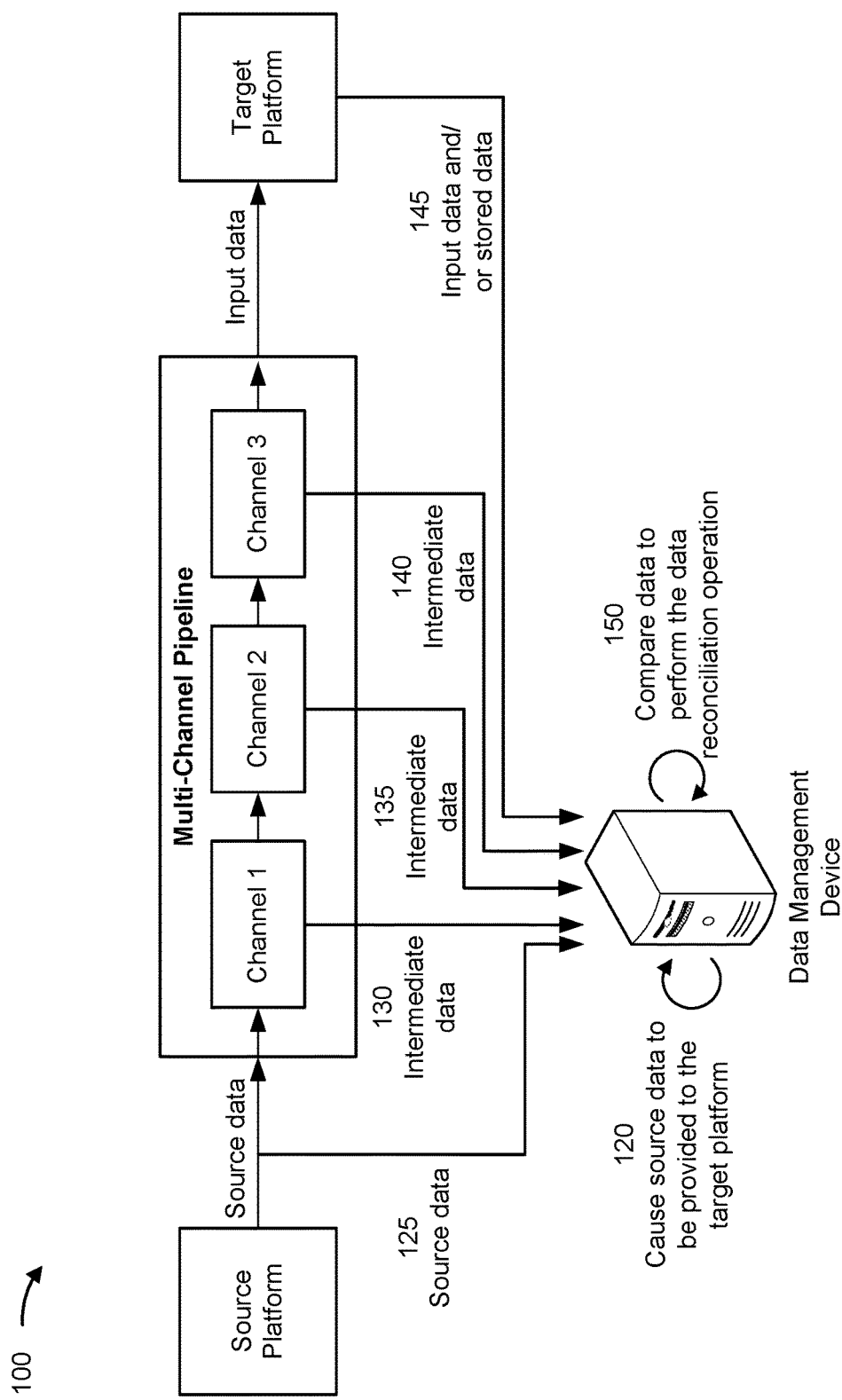
Figure 1C:
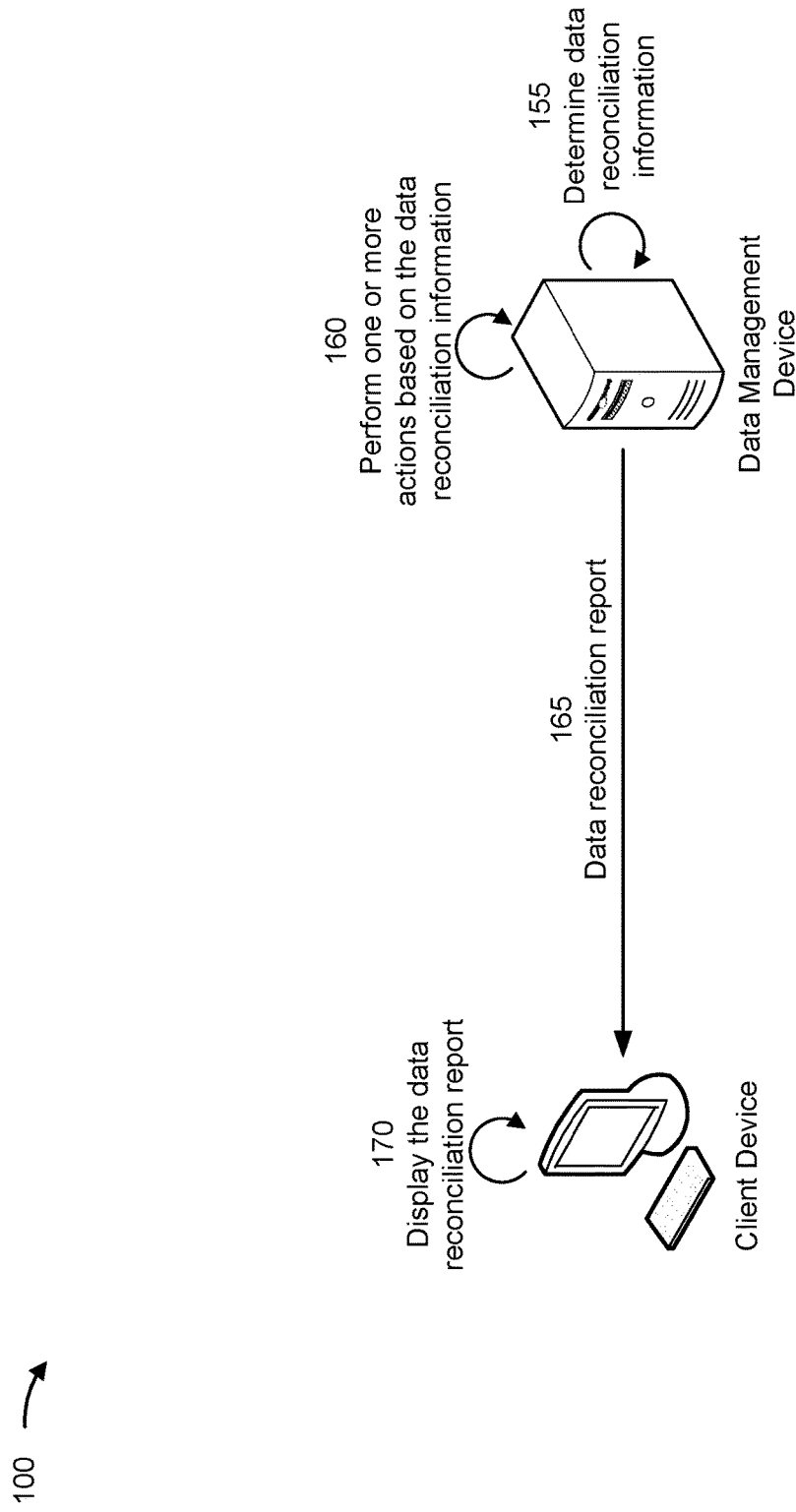

FIGS. 1A-1C are diagrams of an example 100 associated with data reconciliation for a multi-channel pipeline. As shown in FIGS. 1A-1C, example 100 includes a data management device, a client device, a source platform, a target platform, and a multi-channel pipeline (e.g., a multi-channel data integration pipeline and/or a multi-channel data migration pipeline). These devices are described in more detail in connection with FIGS. 2 and 3. The multi-channel pipeline may be a data pipeline between the source platform and the target platform associated with providing, transforming, generating, and/or processing data for a data integration operation and/or a data migration operation, among other examples.

As shown in FIG. 1A, and by reference number 105, the client device may obtain, via a user interface, user input information. For example, the client device may provide, for display, the user interface. The user interface may be associated with data reconciliation for data integration or data migration from the source platform to the target platform. For example, the user interface may enable accessing or viewing data reconciliation information for the multi-channel pipeline, as described in more detail elsewhere herein.

In some implementations, the user interface may include one or more field or user input elements associated with configuration information for the multi-channel pipeline. For example, the user input information may include configuration information. The configuration information may configure one or more data normalization operations for channels included in the multi-channel pipeline.

As used herein, a "channel" may refer to a pathway or conduit through which information, data, or signals are transmitted between different components, systems, and/or entities. For example, a channel may include one or more device, a medium, and/or an interface that facilitates the transfer of data, signals, or communication between distinct entities, device, or systems. A channel may employ specific protocols, formats, schema, and/or methodology, among other examples. Channels may serve as bridges connecting sources and destinations, enabling seamless data exchange, real-time updates, and/or interactions, among other examples. In some implementations, a channel may perform one or more data operations, such as a transformation operation, an aggregation operation, a generation operation, and/or another data operation. A channel may include an API (e.g., that enable programmatic access to services), a stream (e.g., configured to support continuous and real-time data flow), a data source, a file transfer protocol, a message queue, a remote procedure call, a web socket, an event stream, a data integration channel (e.g., configured to perform an extract, transform, load (ETL) operation), a physical communication channel, and/or other types of channels.

For example, the configuration information may include one or more data transformation rules for comparing data from a first channel to data from a second channel included in the multi-channel pipeline. For example, the configuration information may include one or more mappings. A mapping may be between data elements of a first channel and data elements of a second channel. For example, the mapping may define how an element from the first channel should be transformed or mapped to be compared to a corresponding data element associated with the second channel. In some implementations, the user input information may include data normalization information indicating one or more mappings between data modelings of two or more channels of the multiple channels included in the multi-channel pipeline. A data modeling may define how a given channel structures, names, organizes, and/or represents data. For example, the data normalization information may define how to compare data from the two or more channels.

In some implementations, the configuration information may include a mapping document that defines the differences between the schemas of different channels included in the multi-channel pipeline. For example, the mapping document may define how data types, structures, and/or relationships for the different channels differ. In some implementations, the mapping document may include instructions for transforming the one schema of a given channel into another schema of another channel. In some implementations, the configuration information may include one or more normalization functions or scripts that are configured to, when executed by the data management device, perform one or more data normalization operations. For example, the one or more normalization functions or scripts map be configured to, when executed by the data management device, convert data from a source format (e.g., of a first channel) to a target format (e.g., of a second channel), considering any modifications, such as data type conversions, date formatting, and/or unit conversions, among other examples.

In some implementations, the configuration information may include one or more data field reconciliation rules. For example, the one or more data field reconciliation rules may define how discrepancies in field names, units, and/or values between different channels are to be resolved. For example, the one or more data field reconciliation rules may enable the data management device to map synonymous field names, convert units, and/or derive missing values, among other examples, when comparing data associated with a first channel to data associated with a second channel.

In some implementations, the configuration information may include a mapping between channels included in the multi-channel pipeline. For example, the multi-channel pipeline may include data passing from one channel to another channel. The mapping between channels may indicate which channels directly communicate data between them. This may enable the data management device to channels for comparison. For example, by comparing two channels that directly communicate, the data management device may be enabled to identify where in the multi-channel pipeline an error occurred (e.g., if data from two channels that don't directly communicate are compared, the error could occur at intermediate channels between the two channels and it may not be clear where or at which channel the error occurred).

In some implementations, the user input information may include scheduling information. For example, the scheduling information may define timing and/or events associated with performing one or more data reconciliation operations described herein. For example, the scheduling information may indicate a periodic schedule at which data is to be obtained and/or compared for a data integration operation. Additionally, or alternatively, the scheduling information may define one or more events that may trigger the data to be obtained and/or compared for a data integration operation. For example, an event may include receiving an indication that the target platform has obtained and/or stored data via the multi-channel pipeline.

In some implementations, the user input information may include an indication of two or more channels, from the multiple channels included in the multi-channel pipeline, to be compared. For example, the user interface may include one or more elements or fields to enable a user to select two or more channels for comparison. For example, if the user input information indicates a first channel and a second channel, then the data management device may identify that intermediate data associated with the first channel is to be compared to intermediate data from the second channel, as described in more detail elsewhere herein. This may enable the user to gain more granular level of detail as to the operations of the multi-channel pipeline because the user may select particular channels for data reconciliation operations. As a result, processing resources, computing resources, network resources, and/or time may be conserved that would have otherwise been used associated with the user reviewing all data reconciliation information for the multi-channel pipeline, identifying information associated with the two or more channels, extracting the information, and reviewing the information associated with the two or more channels. In other words, the user interface may enable the user to quickly and easily access relevant information from the data reconciliation information for the multi-channel pipeline, thereby improving access to the data reconciliation information and improving the user experience.

As shown by reference number 110, the client device may transmit, and the data management device may receive, the user input information. For example, the client device may provide the user input information to an API associated with the data management device. The API may be configured to provide the user input information to the data management device. In some implementations, the API may be configured to store the user input information in one or more databases that are accessible by the data management device. In such examples, the data management device may obtain the user input information via the one or more databases.

As shown by reference number 115, the data management device may configure a data reconciliation operation based on the user input information. For example, the data management device may configure one or more data normalization operations based on the user input information (e.g., based on the configuration information and/or the mapping information included in the user input information). Additionally, or alternatively, the data management device may be configured to access and/or obtain data (e.g., source data, intermediate data, and/or input data, as described herein) in accordance with the user input information.

As shown in FIG. 1B, and by reference number 120, the data management device may cause source data to be provided to the target platform via the multi-channel pipeline. The source data may be data that is provided by and/or stored by the source platform. For example, the source data may be data that is to be migrated to, or integrated into, the target platform. In some implementations, the data management device may detect that the source data has been provided to the target platform via the multi-channel pipeline (e.g., rather than causing the source data to be provided). The source data may include one or more files, one or more databases, one or more data elements, and/or other types of data.

As described elsewhere herein, the target platform may be an API controlled platform. For example, the target platform may be associated with one or more APIs or programs that are configured to manage data access or storage for the target platform. In some implementations, data may only be stored in, added to, or otherwise accessed via the one or more APIs or programs. In other words, one or more databases included in the target platform (e.g., database(s) in which the source data is to be stored) may not be directly accessible. Instead, the one or more databases may be accessible by providing instructions to the one or more APIs or programs that cause the one or more APIs or programs to access the one or more databases. The multi-channel pipeline may be configured to prepare or provide the source data in a manner that enables the one or more APIs or programs to read, understand, or otherwise provide the source data to the target platform. For example, the source data may be modified, enhanced, edited, and/or otherwise modified (e.g., via channels included in the multi-channel pipeline) such that the source data may be successfully stored by the target platform via the one or more APIs or programs.

As shown by reference number 125, the data management device may obtain, via the source platform, the source data that is to be provided to the target platform. For example, the data management device may communicate with the source platform (or a program or API associated with the source platform) to obtain the source data. In some implementations, when the source platform provides the source data to the multi-channel pipeline, a steaming event may be generated that causes the source data to be provided to the data management device via a streaming platform.

As shown in FIG. 1B, the data management device may provide the source data via the multi-channel pipeline to cause input data to be provided to the API associated with the target platform. As shown in FIG. 1B, the source data may be an input to the multi-channel pipeline and the input data may be an output of the multi-channel pipeline. The multi-channel pipeline may include multiple channels (e.g., three channels as shown in FIG. 1B as an example). For example, the multi-channel pipeline may be a multi-channel data integration pipeline and/or a multi-channel data migration pipeline, among other examples. Although FIG. 1B shown the multiple channels as being arranged in a sequential or linear manner (e.g., ordered such that a first channel provides data to a second channel and the second channel provides data to a third channel, and so on). However, in some implementations, one or more channels may perform operations concurrently or simultaneously.

As shown in FIG. 1B, the data management device may obtain sets of intermediate data associated with respective channels of the multiple channels included in the multi-channel pipeline. For example, the data management device may obtain intermediate data from each channel included in the multi-channel pipeline. As used herein, "intermediate data" may refer to data that is output, generated, and/or processed via a given channel included in the multi-channel pipeline. As an example, as shown by reference number 130, the data management device may obtain first intermediate data via a first channel (e.g., channel 1). As shown by reference number 135, the data management device may obtain second intermediate data via a second channel (e.g., channel 2). As shown by reference number 140, the data management device may obtain third intermediate data via a third channel (e.g., channel 3). In other implementations, the data management device may obtain intermediate data from additional channel or fewer channels based on a configuration of the multi-channel pipeline.

For example, the data management device may establish a communication connection with each channel included in the multi-channel pipeline. As shown in FIG. 1B, for the source data to be integrated into the target platform (e.g., provided to the target platform), the source data may be transmitted over multiple hops (e.g., where each hop is associated with a channel) before the source data is provided to one or more APIs of the target platform. For example, the multi-channel pipeline may be associated with performing one or more data operations (e.g., each channel may perform one or more data operations) to ensure that the source data is in a suitable form to be provided to and/or stored via the target platform. Establishing the communication connection with each channel may enable the data management device to determine whether the source data has been successfully communicated or transformed at each hop included in the multi-channel pipeline.

In some implementations, a communication connection between the data management device and a given channel may include an API, a data stream (e.g., a data streaming platform), or another type of communication connection. In some implementations, the data management device may transmit, via the communication connection associated with a given channel, a request for intermediate data stored via the given channel. The data management device may receive, via the communication connection associated with the given channel, the intermediate data based on transmitting the request.

In some implementations, the data management device may obtain intermediate data from a given channel based on the user input information. For example, the user input information may include configuration information, as described above. The configuration information may indicate an address of a given channel (e.g., a uniform resource locator (URL) address), authentication information (e.g., such as a password or other information that may be provided to enable the data management device to access the intermediate data), data elements that are expected to be stored by a given channel (e.g., to enable the data management device to identify what data should be requested from a given channel), and/or other information to enable the data management device to access intermediate data from a given channel. For example, to obtain intermediate data from a given channel, the data management device may transmit, to the given channel, configuration information (e.g., indicated by the user input information) to query the intermediate data stored via the given channel.

In some implementations, the data management device may obtain the sets of intermediate data based on detecting a data comparison event. In some implementations, the data comparison event may be associated with a periodic schedule. For example, the data management device may obtain the sets of intermediate data in accordance with a periodic schedule (e.g., may obtain the sets of intermediate data periodically). For example, the data management device may obtain the sets of intermediate data at a given time each day. In such examples, the data comparison event may include detecting that a current time is the given time indicated by the periodic schedule.

Additionally, or alternatively, the data comparison event may be based on a comparison of the source data to the input data and/or data stored by the target platform. For example, as shown by reference number 145, the data management device may obtain input data and/or stored data associated with the target platform. For example, the input data may be an output of the multi-channel pipeline that is provided to one or more APIs of the target platform (e.g., to cause the input data to be stored via the target platform). The stored data may be data that is actually stored via the target platform. For example, the data management device may obtain input data via one or more channels in the multi-channel pipeline that communicate with the API(s) of the target platform (e.g., where the one or more channels in the multi-channel pipeline are shown as channel 3 in FIG. 1B). The data management device may obtain the stored data based on communicating via the API(s) of the target platform. For example, the data management device may transmit (e.g., via a query and/or an API call) a request for certain data (e.g., corresponding to the source data) that is stored via the target platform. The data management device may receive, via the API(s) of the target platform, the stored data based on transmitting the request.

As shown by reference number 150, the data management device may compare data to perform the data reconciliation operation. For example, the data management device may compare the source data, the sets of intermediate data, the input data, and/or the stored data. In some implementations, the data reconciliation operation may include comparing the source data to the input data and/or the stored data. For example, the data management device may perform one or more data normalization operations (e.g., based on information indicated via the user input information) to normalize the source data, the input data, and/or the stored data for comparison.

In some implementations, the data management device may compare the source data to the input data and/or the stored data to determine whether any data discrepancy events are detected. As used herein, a "data discrepancy event" refer to one or more inconsistencies, variations, and/or contradictions in the two data sets that should include the same information. A data discrepancy event may indicate disparities in values, formats, structures, or interpretations of data. A data discrepancy event may occur due to errors in data collection, processing, transformation, integration, and/or reporting, among other examples. For example, a data discrepancy event may be associated with differences in a quantity of data elements (e.g., entries), differences in one or more fields (e.g., columns and/or rows in a database), and/or differences in one or more data values (e.g., values of given data elements), among other example, between two or more data sets that should include the same information.

For example, as described elsewhere herein, a data migration operation or a data integration operation may be associated with causing the source data to be stored or integrated via the target platform. Therefore, for the data migration operation or the data integration operation to be considered successful, the source data, the input data, and the stored data should all indicate the same information. In some implementations, the data management device may determine whether a data discrepancy event is detected when comparing the source data to the input data and/or the stored data.

If no data discrepancy event is detected, then the data management device may determine that the multi-channel pipeline has successfully transform the data and that the data migration operation or the data integration operation is successful. In some implementations, if no data discrepancy event is detected, then the data management device may refrain from performing additional operations associated with the data reconciliation operation. For example, if no data discrepancy event is detected, then the data management device may refrain from obtaining the sets of intermediate data. Additionally, or alternatively, if no data discrepancy event is detected, then the data management device may refrain from comparing the sets of intermediate data. This may conserve processing resources, computing resources, and/or network resources, among other examples, that would have otherwise been associated with obtaining the sets of intermediate data, performing one or more data normalization operations to prepare the sets of intermediate data for comparison, and/or comparing the sets of intermediate data, among other examples, when information included in source data has been successfully provided to and/or stored via the target platform.

In some implementations, the data management device may identify one or more data discrepancy events based on comparing the source data to the input data and/or the stored data. In such examples, the data management device may compare, based on identifying the data discrepancy event and for each step of the multi-channel pipeline, different set of intermediate data from the sets of intermediate data associated with that step. The one or more data discrepancy events may indicate that one or more errors occurs during operation(s) performed in association with the multi-channel pipeline. For example, based on detecting one or more data discrepancy events associated with the source data, the input data and/or the stored data, the data management device may perform one or more additional operations associated with the data reconciliation operation (e.g., to identify the one or more errors and/or specific channel(s) associated with the one or more errors).

For example, a data comparison event (e.g., that triggers the data management device to obtain the sets of intermediate data) may include detecting one or more data discrepancy events associated with the source data, the input data and/or the stored data. The data management device may obtain the sets of intermediate data based on detecting one or more data discrepancy events in association with comparing the source data to the input data and/or the stored data. Additionally, or alternatively, the data management device may compare the sets of intermediate data based on detecting one or more data discrepancy events in association with comparing the source data to the input data and/or the stored data.

For example, for each step or hop of the multi-channel pipeline, the data management device may compare intermediate data from channels associated with that step or that hop. As an example, the data management device may perform one or more data normalization operations to normalize the intermediate data being compared. As an example, the data management device may determine one or more channels associated with the intermediate data being compared. The data management device may determine data normalization operation for the one or more channels based on the user input information. The data management device may perform, using the sets of intermediate data, the one or more data normalization operations in accordance with the data normalization information. For example, the data management device may determine one or more rules or transformations to be applied to one or more sets of intermediate data to normalize the intermediate data for comparison. As an example, the data management device may transform naming conventions, formats, and/or schema, among other examples so that two or more sets of intermediate data can be accurately and easily compared.

For example, as shown in FIG. 1B, the multi-channel pipeline may include a step or hop of data from channel 1 being provided to channel 2. Therefore, the data management device may compare intermediate data associated with channel 1 to intermediate data associated with channel 2 to determine if any data discrepancy events are detected. Similarly, the multi-channel pipeline may include a step or hop of data from channel 2 being provided to channel 3. Therefore, the data management device may compare intermediate data associated with channel 2 to intermediate data associated with channel 3 to determine if any data discrepancy events are detected. The data management device may similarly compare two or more sets of intermediate data associated with each step or each hop of the multi-channel pipeline.

In some implementations, the data management device may perform one or more data comparisons via a machine learning model or an artificial intelligence model. For example, the data management device may provide, to a machine learning model, first intermediate data associated with a first channel of the multiple channels and second intermediate data associated with a second channel of the multiple channels (e.g., where the first channel and the second channel are different types of channels associated with different formats, naming conventions, and/or schema).

The data management device may obtain, via the machine learning model, an indication of whether any data discrepancy events are associated with the first intermediate data and the second intermediate data. For example, the machine learning model may be trained to identify equivalent data elements in different data sets where the equivalent data elements are associated with different data modelings, different names, different formats, and/or different schema, among other examples. For example, the machine learning model may be trained using historical data from different channels. The historical data may include indications of data elements, data fields, schema, and/or naming conventions, among other examples, that are equivalent from different channels. Additionally, or alternatively, training data for the machine learning model may include one or more rules or configuration information (e.g., described above) to define normalization operations to be performed to compare intermediate data from different channels. Therefore, the machine learning model may be configured to identify equivalent data elements in different sets of intermediate data to quickly and easily identify where the different sets of intermediate data convey the same information.

As shown in FIG. 1C, and by reference number 155, the data management device may determine data reconciliation information. The data reconciliation information may indicate whether any data discrepancy events were detected. For example, the data reconciliation information may indicate one or more data discrepancy events and channels, of the multiple channels, associated with respective data discrepancy events of the one or more data discrepancy events. In other words, for each data discrepancy event indicated by the data reconciliation information, the data reconciliation information may indicate one or more channels associated with that data discrepancy event. For example, if the data management device determines that there is a data discrepancy event associated with intermediate data from channel 1 and from channel 2, then the data reconciliation information may indicate that there is a data discrepancy event associated with the channel 1 and/or the channel 2.

In some implementations, the data management device may determine one or more operations and/or processes associated with a given data discrepancy event. For example, a given channel may be configured transform, generate, and/or otherwise process received data in accordance with one or more data operations. The data management device may determine a data discrepancy event associated with the given channel. The data management device may determine that intermediate data associated with the given channel includes (or does not include) data that has been processed correctly in accordance with the one or more data operations. For example, the data management device may determine that intermediate data associated with the given channel includes data that has not been properly transformed or otherwise processed. The data management device may include an indication of the one or more data operations associated with the data discrepancy event in the data reconciliation information.

As shown by reference number 160, the data management device may perform one or more actions based on the data reconciliation information. For example, the one or more actions may include causing the data reconciliation information to be provided for display. For example, as shown by reference number 165, the data management device may provide, for display, a report indicating the data reconciliation information. The report may indicate any detected data discrepancy events and channels (e.g., from the multi-channel pipeline) associated with respective data discrepancy events. As shown by reference number 170, the client device may display the report. For example, the client device may display the report via a page of the user interface that is associated with obtaining the user input information (e.g., as described in connection with FIG. 1A). As a result, a user may be enabled to quickly and easily identify where in the multi-channel pipeline an error occurred when migrating or integrating the source data into the target platform. This may conserve processing resources, computing resources, and/or network resources that would have otherwise been associated with investing each channel of the multi-channel pipeline to identify the channel associated with the error, to investigate operations of the channel to determine a cause of the error, and/or to remedy the cause of the error, among other examples.

In some implementations, the report may indicate a subset of the data reconciliation information. For example, the data management device may receive an indication of one or more channels, of the multiple channels, to be associated with the report (e.g., via the user input information as described in connection with FIG. 1A). In such examples, the data management device may identify whether any detected data discrepancy events are associated with the one or more channels. The data management device may provide, for display, the subset of the data reconciliation information indicating information, from the data reconciliation information, associated with the one or more channels.

Additionally, or alternatively, the one or more actions may include performing, via a channel that is associated with at least one data discrepancy event of the one or more data discrepancy events, a modification to one or more data processing operations based on the at least one data discrepancy event. For example, as described elsewhere herein, the data management device may determine one or more data processing operations that are associated with a given data discrepancy event. In some implementations, the data management device may determine, based on the source data and/or other intermediate data associated with a given comparison, corrected intermediate data for a given data discrepancy event. For example, the given data discrepancy event may be associated with a comparison of first intermediate data (e.g., associated with a first channel of the multi-channel pipeline) to second intermediate data (e.g., associated with a second channel of the multi-channel pipeline). The data management device may determine that one or more data processing operations associated with the second channel were not successfully performed (e.g., resulting in the given data discrepancy event). The data management device may determine the corrected intermediate data for the second channel based on performing the one or more data processing operations using the first intermediate data and/or the source data. In such examples, the one or more actions may include providing, to the second channel, an indication of the corrected intermediate data. This may enable the second channel to provide the corrected intermediate data to one or more other channels in the multi-channel pipeline. As a result, the target platform may obtain corrected data or missing data that is based on the corrected intermediate data, improving the performance of the data integration operation and/or the data migration operation.

As indicated above, FIGS. 1A-1C are provided as an example. Other examples may differ from what is described with regard to FIGS. 1A-1C.

Figure 2:
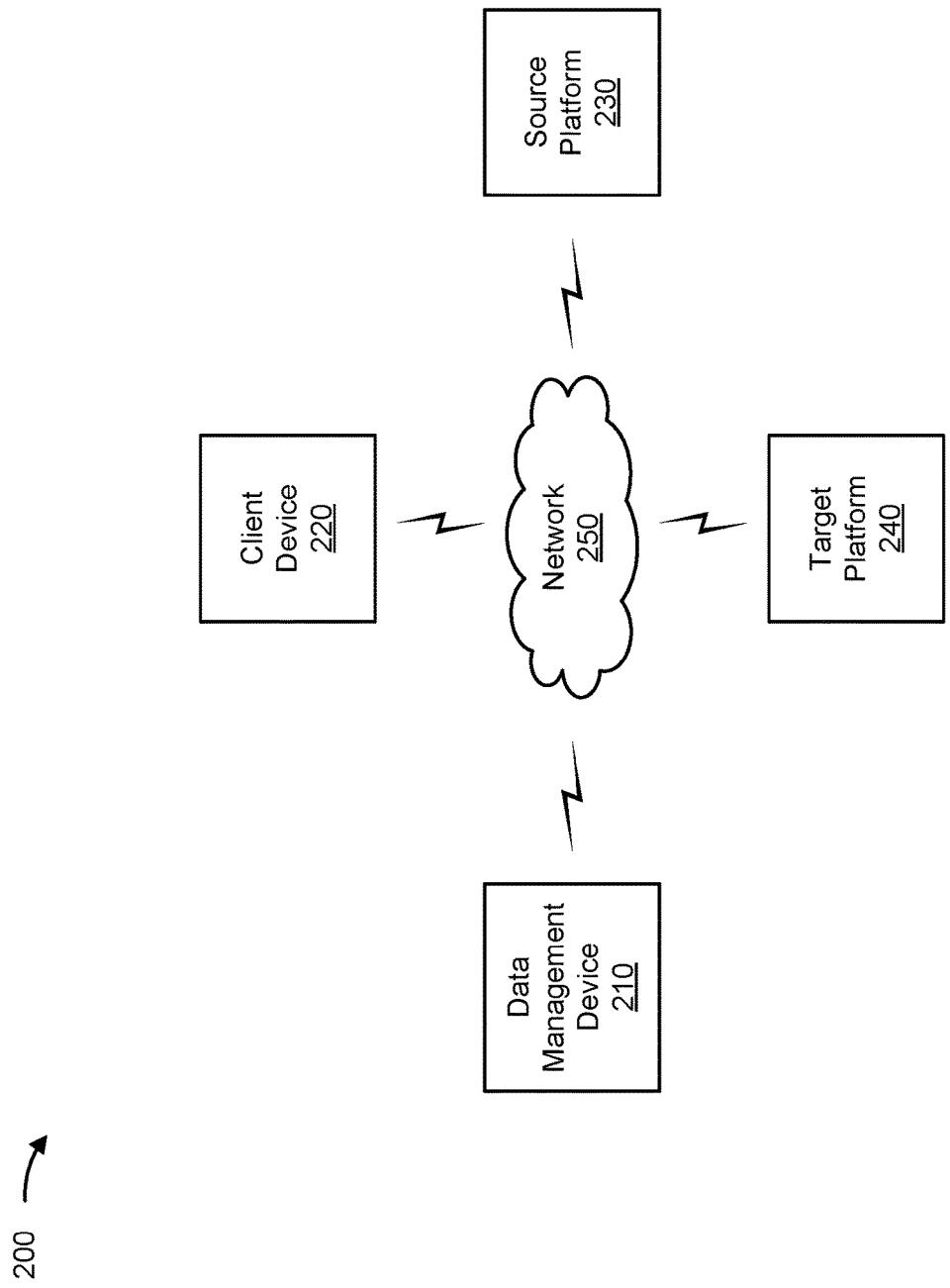
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data management device 210, a client device 220, a source platform 230, a target platform 240, and a network 250. Devices of environment 200 may interconnect via wired connections, wireless connections, or a combination of wired and wireless connections.

The data management device 210 may include one or more devices capable of receiving, generating, storing, processing, providing, and/or routing information associated with data reconciliation for a multi-channel pipeline (e.g., for the target platform 240), as described elsewhere herein. The data management device 210 may include a communication device and/or a computing device. For example, the data management device 210 may include a server, such as an application server, a client server, a web server, a database server, a host server, a proxy server, a virtual server (e.g., executing on computing hardware), or a server in a cloud computing system. In some implementations, the data management device 210 may include computing hardware used in a cloud computing environment.

The client device 220 may include one or more devices capable of receiving, generating, storing, processing, and/or providing information associated with data reconciliation for a multi-channel pipeline (e.g., for the target platform 240), as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The source platform 230 may include one or more devices capable of receiving, generating, storing, processing, providing, and/or routing information associated with data reconciliation for a multi-channel pipeline (e.g., for the target platform 240), as described elsewhere herein. The source platform 230 may include a communication device and/or a computing device. For example, the source platform 230 may include a server, such as an application server, a client server, a web server, a database server, a host server, a proxy server, a virtual server (e.g., executing on computing hardware), or a server in a cloud computing system. In some implementations, the source platform 230 may include computing hardware used in a cloud computing environment.

The target platform 240 may include one or more devices capable of receiving, generating, storing, processing, providing, and/or routing information associated with data reconciliation for the target platform 240, as described elsewhere herein. The target platform 240 may include a communication device and/or a computing device. For example, the target platform 240 may include a server, such as an application server, a client server, a web server, a database server, a host server, a proxy server, a virtual server (e.g., executing on computing hardware), or a server in a cloud computing system. In some implementations, the target platform 240 may include computing hardware used in a cloud computing environment. In some implementations, the target platform 240 may include an API or program that is associated with adding, modifying, editing, and/or otherwise accessing data stored via the target platform 240.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
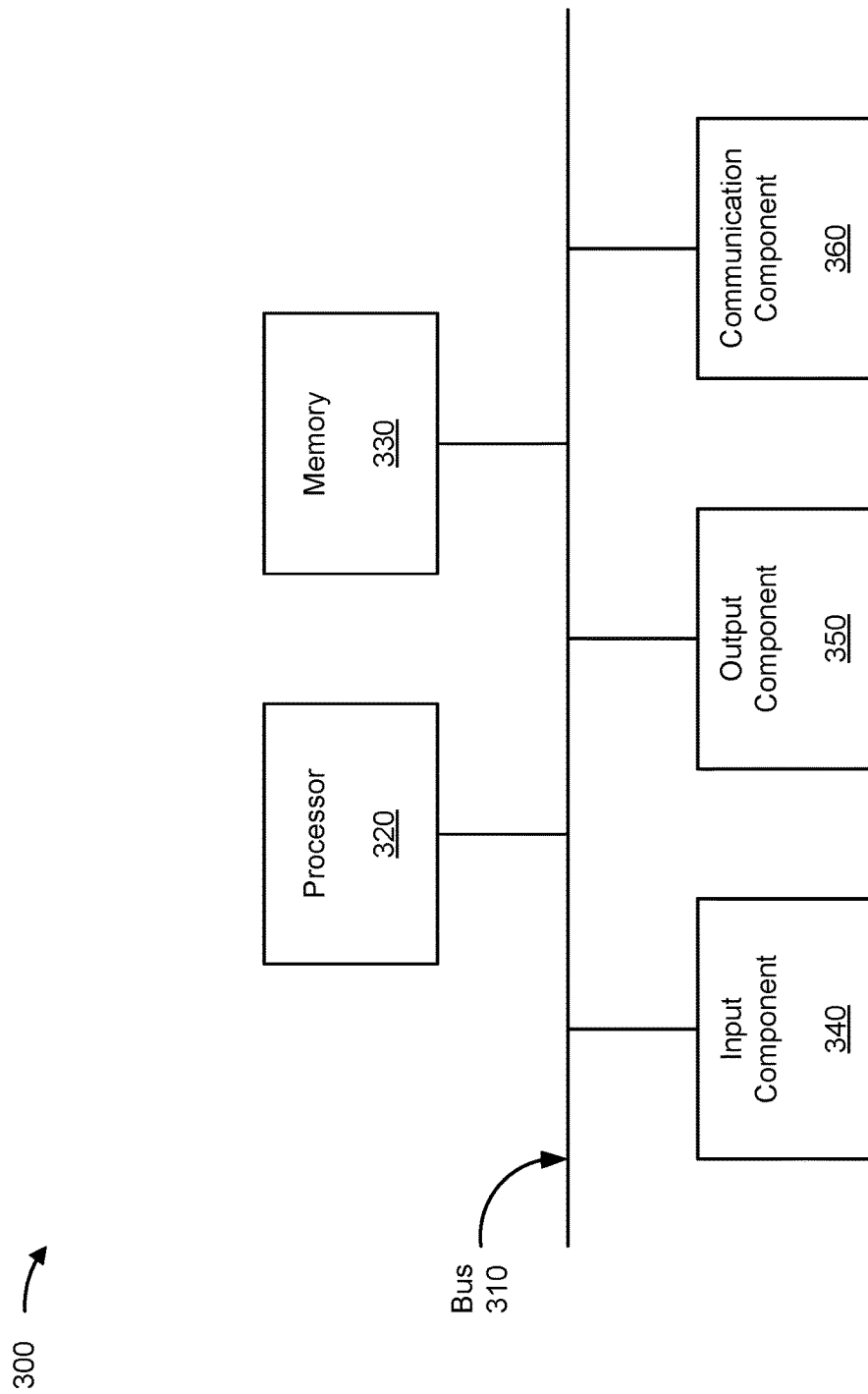
FIG. 3 is a diagram of example components of a device associated with data reconciliation for a multi-channel pipeline, in accordance with some embodiments of the present disclosure.

FIG. 3 is a diagram of example components of a device 300 associated with data reconciliation for a multi-channel pipeline. The device 300 may correspond to the data management device 210, the client device 220, the source platform 230, and/or the target platform 240. In some implementations, the data management device 210, the client device 220, the source platform 230, and/or the target platform 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
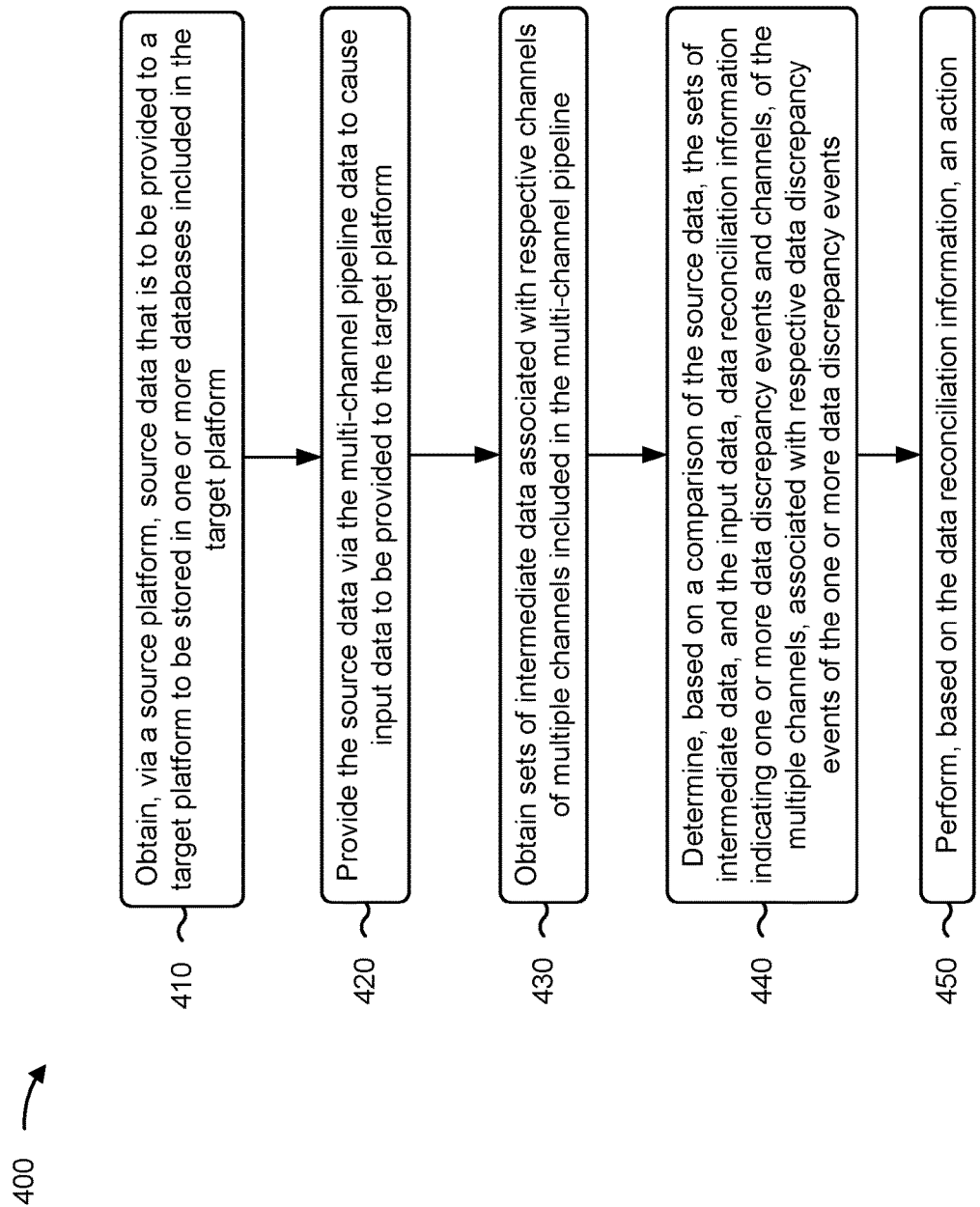
FIG. 4 is a flowchart of an example process associated with data reconciliation for a multi-channel pipeline, in accordance with some embodiments of the present disclosure.

FIG. 4 is a flowchart of an example process 400 associated with data reconciliation for a multi-channel pipeline. In some implementations, one or more process blocks of FIG. 4 may be performed by the data management device 210. In some implementations, one or more process blocks of FIG. 4 may be performed by another device or a group of devices separate from or including the data management device 210, such as the client device 220, the source platform 230, and/or the target platform 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining, via a source platform, source data that is to be provided to a target platform to be stored in one or more databases included in the target platform (block 410). For example, the data management device 210 (e.g., using processor 320 and/or memory 330) may obtain, via a source platform, source data that is to be provided to the target platform to be stored in one or more databases included in the target platform, as described above in connection with reference number 125 of FIG. 1B. The target platform may be the target platform 240. In some implementations, the one or more databases are accessible via a multi-channel pipeline. For example, the one or more databases in the target platform may not be directly accessible and/or may be accessible via one or more APIs, functions, and/or programs associated with the target platform.

As further shown in FIG. 4, process 400 may include providing the source data via the multi-channel pipeline to cause input data to be provided to the target platform (block 420). For example, the data management device 210 (e.g., using processor 320 and/or memory 330) may provide the source data via the multi-channel pipeline to cause input data to be provided to the target platform, as described above in connection with reference number 120 of FIG. 1B. As an example, the data management device 210 may be associated with a data migration operation and/or a data integration operation associated with the source data being provided to or integrated into the target platform. The input data may be an output of the multi-channel pipeline.

As further shown in FIG. 4, process 400 may include obtaining sets of intermediate data associated with respective channels of multiple channels included in the multi-channel pipeline (block 430). For example, the data management device 210 (e.g., using processor 320 and/or memory 330) may obtain sets of intermediate data associated with respective channels of multiple channels included in the multi-channel pipeline, as described above in connection with reference number 130, reference number 130, and/or reference number 140 of FIG. 1B. As an example, the data management device 210 may query each channel included in the multi-channel pipeline to obtain the sets of intermediate data. In some implementations, the data management device 210 may obtain the sets of intermediate data based on detecting a data comparison event, as described in more detail elsewhere herein.

As further shown in FIG. 4, process 400 may include determining, based on a comparison of the source data, the sets of intermediate data, and the input data, data reconciliation information indicating one or more data discrepancy events and channels, of the multiple channels, associated with respective data discrepancy events of the one or more data discrepancy events (block 440). For example, the data management device 210 (e.g., using processor 320 and/or memory 330) may determine, based on a comparison of the source data, the sets of intermediate data, and the input data, data reconciliation information indicating one or more data discrepancy events and channels, of the multiple channels, associated with respective data discrepancy events of the one or more data discrepancy events, as described above in connection with reference number 155 of FIG. 1C. As an example, the data reconciliation information may indicate which channels (e.g., if any) included in the multi-channel pipeline are associated with data discrepancies. In some implementations, the data reconciliation information may indicate one or more data processing operations associated with respective data discrepancy events of the one or more data discrepancy events.

As further shown in FIG. 4, process 400 may include performing, based on the data reconciliation information, an action (block 450). For example, the data management device 210 (e.g., using processor 320 and/or memory 330) may perform, based on the data reconciliation information, an action, as described above in connection with reference number 160 of FIG. 1C. As an example, the action may include providing, for display, a report indicating the data reconciliation information. Additionally, or alternatively, the action may include providing corrected intermediate data associated with one or more data discrepancy events.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data reconciliation for a multi-channel pipeline, the system comprising:
   one or more memories; and
   one or more processors, communicatively coupled to the one or more memories, configured to:
      obtain, via a source platform, source data that is to be provided to a target platform to be stored in one or more databases included in the target platform,
         wherein the one or more databases are accessible via a function associated with the target platform;
      provide the source data via the multi-channel pipeline to cause input data to be provided to the function,
         wherein the source data is an input of the multi-channel pipeline and the input data is an output of the multi-channel pipeline,
         wherein channels of the multi-channel pipeline are associated with different data formats, and
         wherein the channels are configured to transform the source data and provide the transformed source data as the output of the multi-channel pipeline;
      obtain sets of intermediate data associated with respective channels of multiple channels included in the multi-channel pipeline;
      compare the transformed source data, the sets of intermediate data, and the input data based on one or more data normalization operations associated with at least one of the sets of intermediate data;
      identify, based on comparing the transformed source data, the sets of intermediate data, and the input data, data reconciliation information indicating one or more data discrepancy events and channels, of the multiple channels, associated with respective data discrepancy events of the one or more data discrepancy events; and
      perform, based on the data reconciliation information, an action.

2. The system of claim 1, wherein the one or more processors, to perform the action, are configured to:
   provide, for display, a report indicating the data reconciliation information.

3. The system of claim 2, wherein the one or processors are further configured to:
   receive an indication of one or more channels, of the multiple channels, to be associated with the report,
      wherein the report indicates a subset of the data reconciliation information, and
      wherein the subset indicates information, from the data reconciliation information, associated with the one or more channels.

4. The system of claim 1, wherein the one or processors are further configured to:
   obtain, via a user interface, data normalization information indicating one or more mappings between data modelings of two or more channels of the multiple channels,
      wherein the data normalization information defines how to compare data from the two or more channels.

5. The system of claim 4, wherein the one or more processors, to compare the transformed source data, the sets of intermediate data, and the input data, are configured to:
   perform, using the sets of intermediate data, the one or more data normalization operations in accordance with the data normalization information.

6. The system of claim 1, wherein the one or more processors, to compare the transformed source data, the sets of intermediate data, and the input data, are configured to:
   provide, to a machine learning model, first intermediate data associated with a first channel of the multiple channels and second intermediate data associated with a second channel of the multiple channels,
      wherein the first channel and the second channel are different types of channels; and
   obtain, via the machine learning model, an indication of whether any data discrepancy events are associated with the first intermediate data and the second intermediate data.

7. The system of claim 1, wherein the one or more processors, to compare the transformed source data, the sets of intermediate data, and the input data, are configured to:
   identify a data discrepancy event based on comparing the transformed source data to the input data; and
   compare, based on identifying the data discrepancy event and for each step of the multi-channel pipeline, different set of intermediate data from the sets of intermediate data associated with that step.

8. The system of claim 1, wherein the one or more processors, to compare the transformed source data, the sets of intermediate data, and the input data, are configured to:
  compare at least one of:
    a quantity of data elements,
    one or more fields, or
    one or more data values.

9. A method for data reconciliation for a target platform, comprising:
  obtaining, by a device and via a source platform, source data that is to be provided to the target platform to be stored in one or more databases included in the target platform,
    wherein the one or more databases are accessible via a multi-channel pipeline;
  providing, by the device, the source data via the multi-channel pipeline to cause input data to be provided to the target platform,
    wherein multiple channels of the multi-channel pipeline are associated with different data formats, and
    wherein the channels are configured to transform the source data and provide the transformed source data as output of the multi-channel pipeline;
  obtaining, by the device, sets of intermediate data associated with respective channels of the multiple channels included in the multi-channel pipeline;
  determining, by the device and based on a comparison of the transformed source data, the sets of intermediate data, and the input data, data reconciliation information indicating one or more data discrepancy events and channels, of the multiple channels, associated with respective data discrepancy events of the one or more data discrepancy events; and
  performing, by the device and based on the data reconciliation information, an action.

10. The method of claim 9, wherein performing the action comprises:
  providing, for display, a report indicating the data reconciliation information.

11. The method of claim 9, further comprising:
  obtaining, via a user interface, data normalization information indicating one or more mappings between data modeling of two or more channels of the multiple channels,
    wherein the data normalization information defines how to compare data from the two or more channels.

12. The method of claim 9, wherein determining the data reconciliation information comprises:
  providing, to a machine learning model, the transformed source data, the sets of intermediate data, and the input data; and
  obtaining, via the machine learning model, an output indicating whether any data discrepancy events are detected.

13. The method of claim 9, wherein comparing the transformed source data, the sets of intermediate data, and the input data comprises:
  identifying a data discrepancy event based on comparing the transformed source data to the input data; and
  comparing, based on identifying the data discrepancy event and for each step of the multi-channel pipeline, intermediate data from the sets of intermediate data associated with that step.

14. The method of claim 9, wherein the multiple channels include at least one of:
  one or more application programming interfaces (APIs),
  one or more data streaming platforms, or
  one or more data sources.

15. The method of claim 9, wherein performing the action comprises:
  performing, via a channel of the multiple channels that is associated with at least one data discrepancy event of the one or more data discrepancy events, a modification to one or more data processing operations based on the at least one data discrepancy event.

16. A non-transitory computer-readable medium storing a set of instructions, the set of instructions comprising:
  one or more instructions that, when executed by one or more processors of a device, cause the device to:
    obtain, via a source platform, source data that is to be provided to a target platform to be stored in one or more databases included in the target platform;
    provide the source data via a multi-channel pipeline data to cause input data to be provided to the target platform,
      wherein the source data is an input of the multi-channel pipeline and the input data is an output of the multi-channel pipeline,
      wherein channels of the multi-channel pipeline are associated with different data formats, and
      wherein the channels are configured to transform the source data and provide the transformed source data as the output of the multi-channel pipeline;
    obtain sets of intermediate data associated with respective channels of multiple channels included in the multi-channel pipeline;
    compare the transformed source data, the sets of intermediate data, and the input data based on one or more data normalization operations associated with at least one of the sets of intermediate data;
    identify, based on comparing the transformed source data, the sets of intermediate data, and the input data, data reconciliation information indicating one or more data discrepancy events and channels, of the multiple channels, associated with respective data discrepancy events of the one or more data discrepancy events; and
    perform, based on the data reconciliation information, an action.

17. The non-transitory computer-readable medium of claim 16, wherein the one or more instructions further cause the device to:
  receive an indication of one or more channels, of the multiple channels, to be associated with a report, and
  wherein the one or more instructions, that cause the device to perform the action, cause the device to:
    provide, for display, the report indicating a subset of the data reconciliation information,
      wherein the subset indicates information, from the data reconciliation information, associated with the one or more channels.

18. The non-transitory computer-readable medium of claim 16, wherein the one or more instructions, that cause the device to compare the transformed source data, the sets of intermediate data, and the input data, cause the device to:
  provide, to a machine learning model, first intermediate data associated with a first channel of the multiple channels and second intermediate data associated with a second channel of the multiple channels,
    wherein the first channel and the second channel are different types of channels; and obtain, via the machine learning model, an indication of whether any data discrepancy events are associated with the first intermediate data and the second intermediate data.

19. The non-transitory computer-readable medium of claim 16, wherein the one or more instructions, that cause the device to compare the transformed source data, the sets of intermediate data, and the input data, cause the device to:
  identify a data discrepancy event based on comparing the transformed source data to the input data; and
  compare, based on identifying the data discrepancy event and for each step of the multi-channel pipeline, intermediate data from the sets of intermediate data associated with that step.

20. The non-transitory computer-readable medium of claim 16, wherein the one or more instructions, that cause the device to perform the action, cause the device to:
  perform, via a channel, of the multiple channels, that is associated with at least one data discrepancy event of the one or more data discrepancy events, a modification to one or more data processing operations based on the at least one data discrepancy event.

* * * * *